April 1, 1969    P. H. SMITH    3,435,753
PREPARATION OF FOOD PRODUCTS
Filed Aug. 16, 1966    Sheet 1 of 3

INVENTOR
PETER HAROLD SMITH
BY PENDLETON, NEUMAN,
SEIBOLD & WILLIAMS
ATTORNEY

INVENTOR
PETER HAROLD SMITH
BY PENDLETON, NEUMAN,
SEIBOLD & WILLIAMS
ATTORNEY

United States Patent Office 3,435,753
Patented Apr. 1, 1969

3,435,753
PREPARATION OF FOOD PRODUCTS
Peter Harold Smith, Maidenhead, England, assignor to Microtherm Limited
Filed Aug. 16, 1966, Ser. No. 572,745
Int. Cl. A47j 27/00; H05b 9/06
U.S. Cl. 99—327
10 Claims

ABSTRACT OF THE DISCLOSURE

In an oven for heating articles by means of microwave energy, a pair of oven cavities cooperate with a single source of microwave energy. A rotatable waveguide arrangement switches the microwave energy from the source alternately to the two cavities. An interlock apparatus prevents switching while the source is operating.

Figure 1:
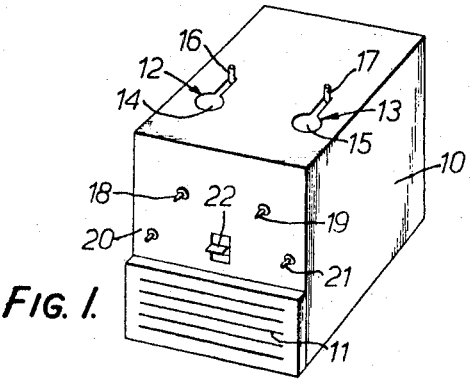

This invention relates to the preparation of food products which it is desired should be stored in a cool or cold temperature but heated rapidly when required to a temperature suitable for immediate consumption. More specifically, the invention concerns an apparatus for heating food products in this way, making use of microwave radio energy for heating the products. Though the invention can be applied to the heating of the variety of products, it is particularly suited to heating a so-called hot dog, consisting of a bread bun or bread roll having a filling, usually a frankfurter sausage.

In copending applications 293,685 (filed July 19, 1963, now Patent No. 3,283,113, issued Nov. 1, 1966), and 404,770 (filed Oct. 19, 1964, now Patent No. 3,289,570, issued Dec. 6, 1966), there are described forms of ovens by which a product of this kind can be heated rapidly by microwave energy. Ovens of this kind can be made in which the heating time for one product is a matter of a few seconds, and such an oven is very suited to heating products at the point of sale.

The time taken to heat a specific product by means of a microwave oven is dictated very largely by the available power output from the magnetron or equivalent power source, assuming that the oven is efficiently operated. The present invention is based on appreciation of the fact that time is taken to load and unload the product from the oven.

A broad object of the invention is to provide heating apparatus which is particularly convenient in operation when it is desired to heat a plurality of articles.

A related object of the invention is to provide heating apparatus including a plurality of heating chambers.

A particular object of the invention is to economise in the provision of sources of heating energy.

An object of one aspect of the invention is to provide heating apparatus of this kind adapted for operation by an attendant and particularly to provide suitable control means which opens doors associated with the heating chambers at the end of the heating cycles.

An object of another aspect of the invention is to provide heating apparatus for operation by a customer, and to reduce the risk of misuse, or wanton abuse of the apparatus.

It is a particular object of this aspect of the invention to provide means for interlocking the operation of the apparatus with the operation of an associated vending mechanism so that doors to the heating chambers of the apparatus are normally maintained closed, but are selectively opened on actuation of the vending mechanism.

In general terms, the invention provides heating apparatus having a plurality of heating chambers for receiving articles to be heated, and a source of heating energy which can be coupled alternatively to said heating chambers.

In one arrangement the apparatus is operable under the control of an attendant, and a control circuit may be provided which is operable when products are inserted simultaneously in the first and second cavities for selectively opening the first oven cavity door automatically when the heating cycles of a product in the associated oven cavity has been completed, and automatically switching the heating energy to the second cavity.

The apparatus may be associated with a vending machine for operation by a customer, and an arrangement may then be provided for automatically closing doors to the oven cavities when not in use and for selectively opening one or more of the doors as the vending mechanism is operated, to reduce the risk of damage by misuse or vandalism.

Figure 2:
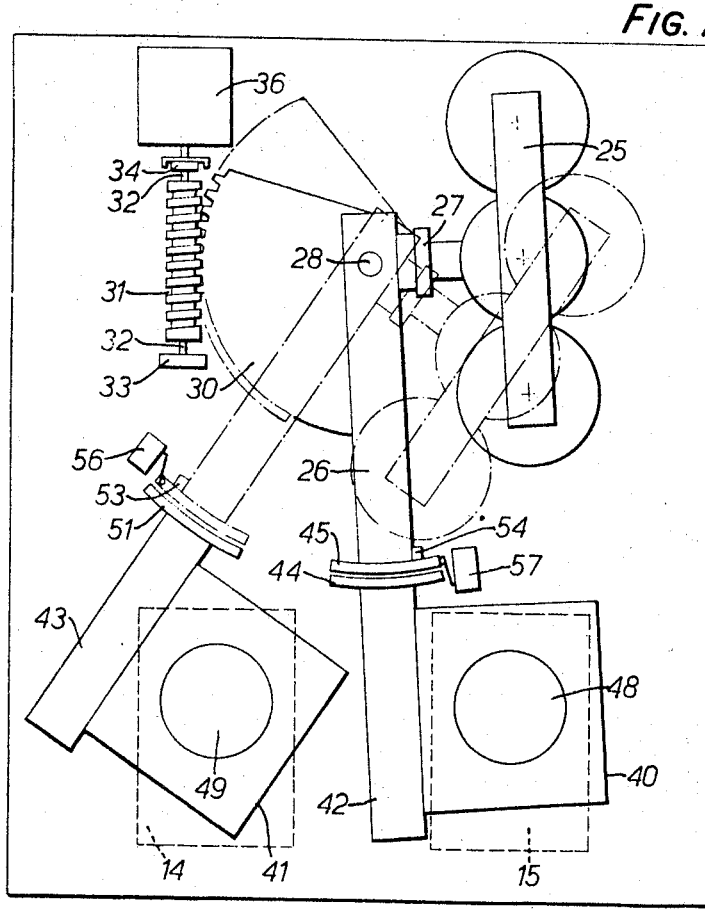
Figure 3:
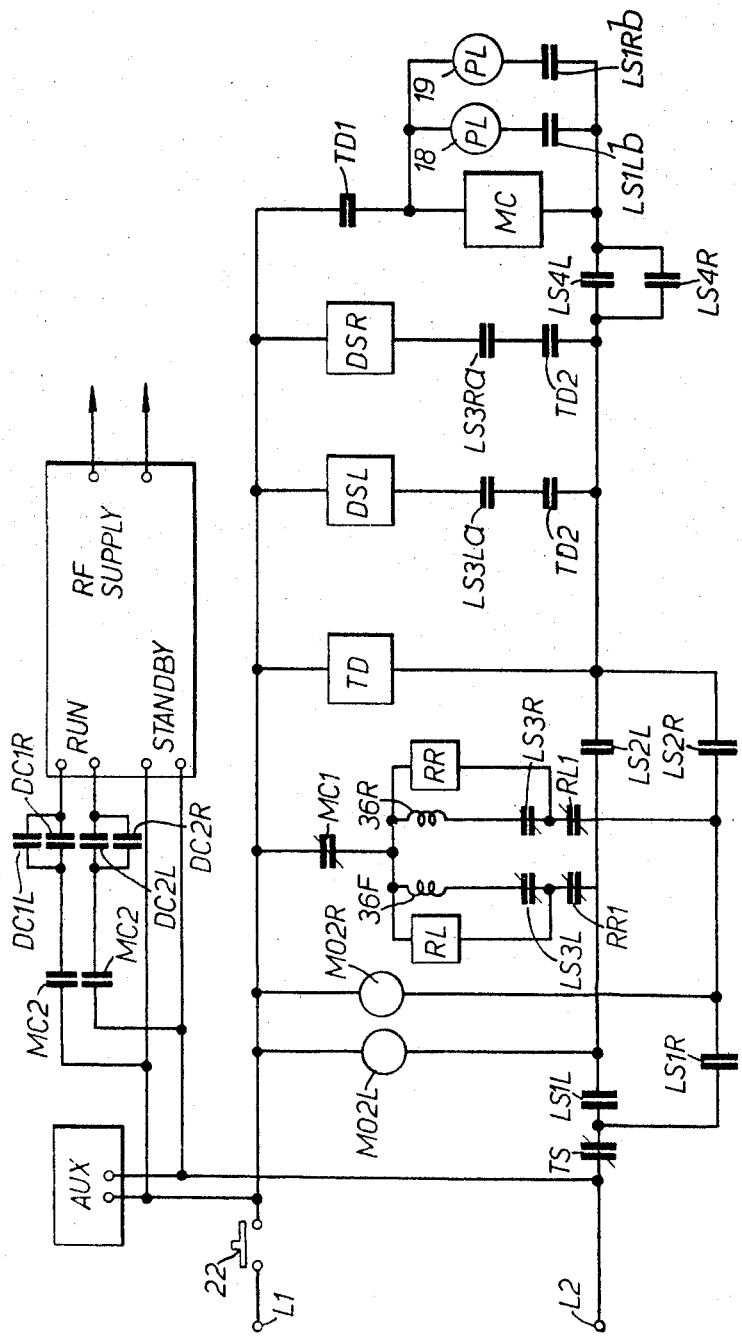
Figure 4:
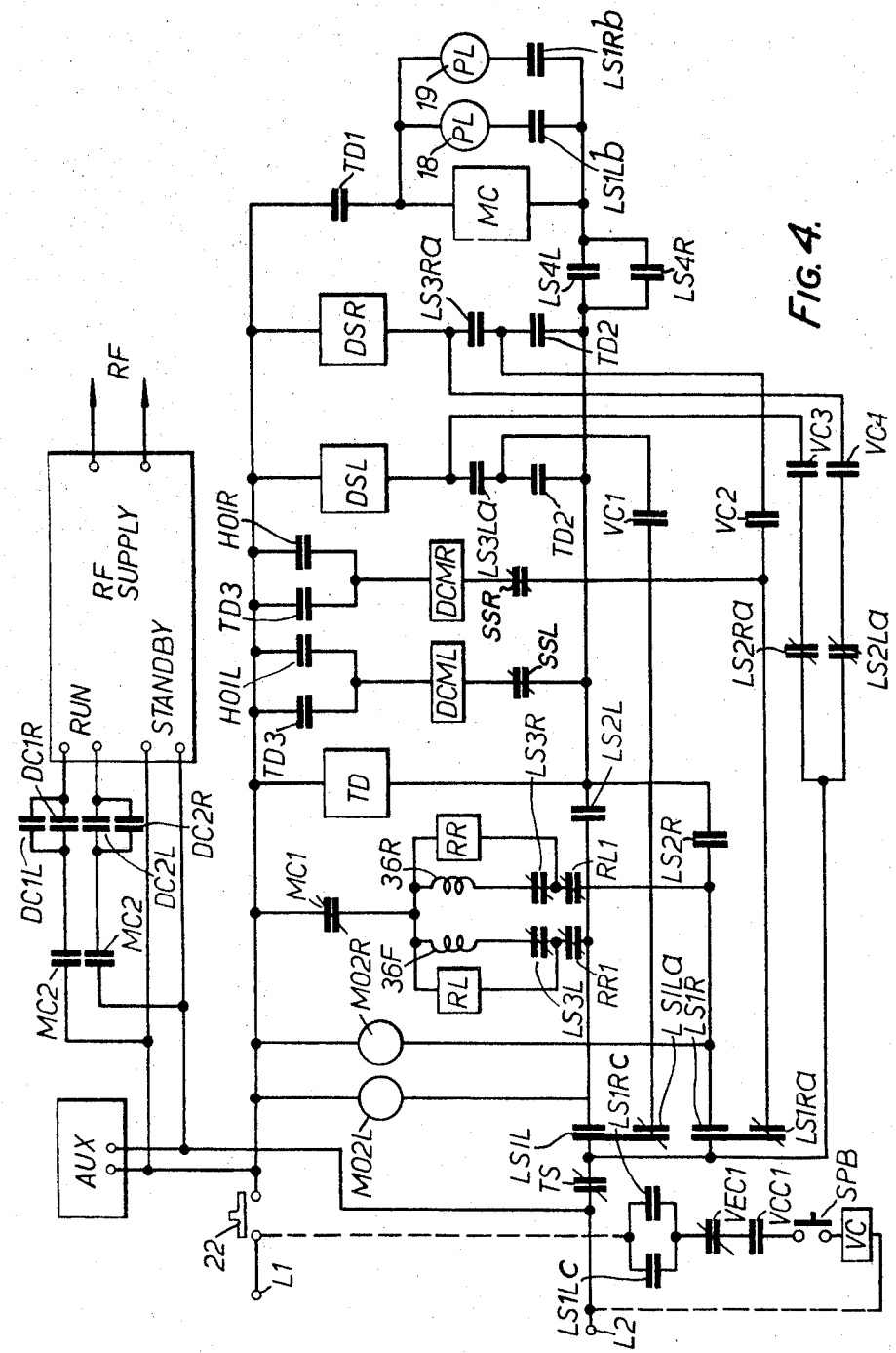

Other features and advantages of the invention will appear from the following description of one embodiment thereof, given by way of example, in conjunction with the accompanying drawings in which:

FIGURE 1 is a diagrammatic perspective view of an oven in accordance with the invention, FIGURE 2 is a diagrammatic plan view of component parts of the oven shown in FIGURE 1, FIGURE 3 is a simplified circuit diagram of parts of control and supply circuits for the oven adapted for operation by an attendant, and FIGURE 4 is a simplified circuit diagram of control and supply circuits for the oven associated with a vending mechanism and adatped for operation by a customer.

The oven shown in FIGURE 1 is intended for operation by an attendant, at a point of sale. The oven comprises a casing 10 within which is housed a magnetron mivrowave generator, complete with its air cooling system, the air for which is admitted through an air filter 11. The oven has on its upper surface two openings 12 and 13, closed respectively by doors 14 and 15, for the insertion of products into the oven for heating. The doors have respectively small handles 16 and 17, to enable them to be moved. Indicator lamps 18 and 19 show when power is being supplied to the products and door opening switches 20 and 21 are also provided. A main control switch 22 is also fitted on the front panel. This oven resembles the ovens described in the two copending applications referred to. In operation the operator inserts a product to be heated into an oven, and closes one of the doors. Automatically, energy is applied to heat the product and at the end of a heating period the door is automatically released and moved by spring tension, allowing the product to rise partly through the opening, making it readily accessible. Whilst one product is being heated in this way, a second product can be loaded into the other cavity of the oven. The product, if a hot dog or like shaped product, is conveniently formed as a package in the manner described in copending applications 518,578, filed Jan. 4, 1966, or 587,356, filed Sept. 16, 1966.

FIGURE 2 shows diagrammatically the disposition of the parts within the oven. A magnetron 25 is coupled to a feed waveguide 26 through an axial coupling flange 27. The magnetron is supported by the flange 27 and the whole assembly is pivotally mounted for movement about a vertical axis at 28, to enable the assembly to move between two limiting positions of which one is shown in full line in FIGURE 2 and the other in broken line. The assembly can be moved in this way by a reversible electric motor which is here shown as coupled to the assembly through a toothed quadrant 30, fast to the assembly, which at its edge engages a worm pinion 31. Pinion 31 is carried on a shaft 32, mounted in bearings at 33 and 34, and rotatable by means of the drive motor 36.

The purpose of mounting the magnetron assembly movably in this way is to enable it to feed alternatively to cavities within the oven, indicated at 40 and 41 respectively. Cavity 40 has a feed waveguide 42 and cavity 41 a similar waveguide 43. Waveguide 42 terminates in a coupling flange 44, which in one position of the magnetron assembly lies adjacent a similar coupling flange 45 on the end of the feed waveguide 26 of the magnetron assembly. When the flanges 44 and 45 are in alignment, they are not in electrical contact, and to reduce stray fields from the coupling the flanges can be formed as quarter wave chokes. Cavity 40 has within it a nylon or similar low loss tube 48, which can be rotated about its vertical axis by means of a rotator motor, not shown. Similarly, there is a tube 49 within the cavity 41, also capable of rotation by a drive motor. The upper ends of these two tubes can be closed by the doors 14 and 15 respectively.

When motor 36 is appropriately energised, it will move the assembly from the position shown in full lines in FIGURE 2 to that shown in broken line. In this latter position, the coupling flange 45 on the end of the feed waveguide 26 now lies adjacent a flange 51, similar to flange 44, on the end of a feed waveguide 43 for cavity 41. Microwave energy will then be fed to the latter cavity, to heat a product within the tube 49. The angular movement of the magnetron assembly in moving between the two positions is limited by means of abutment stops 53, 54.

Electrical control circuit means are provided for securing semiautomatic operation of the apparatus described, in conjunction with suitable interlock and protective means, to protect the circuit against faulty or dangerous operation. The circuit of the control means is indicated, in simplified form, in FIGURE 3. Before describing FIGURE 3, it is convenient first to refer to some of the components. When a product is inserted into one of the cavities, a corresponding plunger (not shown) is depressed against spring bias, and latched in its lower position to close corresponding normally open limit switch contact pairs LS1L, LS1Lb and LS1R, LS1Rb, corresponding to the left and right cavities as seen in FIGURE 1. The tubes 48 and 49 will be rotated by respective rotator motors MO2L and MO2R, and closure of the doors 14 and 15 will close normally open limit switch contact pairs LS2R and LS2L respectively, and also DC1L, DC2L and DC1R, DC2R. Motor 36 is a reversible motor and has two energising windings 36R and 36F. The energisation of the two windings is controlled by limit switches, conveniently consisting of microswitches 56 and 57 having normally closed contact pairs LS3L and LS3R respectively which are opened by engagement of the waveguide 26 with the associated microswitch, and normally open contact pairs LS3La and LS3Ra which are closed by such engagement. Also, to ensure that the magnetron is switched on only when the waveguide feed tubes are in alignment, two further limit switches (not shown) having normally open contact pairs LS4L and LS4R are provided. A thermally responsive switch having contacts TS is associated with the magnetron, the contacts opening if the magnetron assembly becomes excessively hot. To ensure that only one of the windings 36F and 36R is energised when the two products are simultaneously inserted into respective cavities, relays RL and RR are associated with the windings, the relays having respective normally closed contact pairs RL1 and RR1. A timing device is provided having normally open contact pairs TD1 and TD2, the contacts TD1 being closed during the period when heating energy is to be supplied to one of the oven cavities, and TD2 being closed at the end of this period. A contactor MC has a normally closed contact pair MC1 which overrides the operation of the waveguide control motor 36, and normally open contacts MC2 which control the supply of high tension voltage to the magnetron. Solenoids DSL and DSR are provided which can be energised to release respective latches holding the doors 14 and 15 closed. The latches can be released manually by operation of the buttons 20 and 21 which are mechanically linked to the latches, but in an alternative arrangement the buttons operate switches which supply current to the solenoids DSL and DSR when the respective button is depressed.

When a mains switch 22 is operated, line voltage from channels L1 and L2 is applied to operate any auxiliary devices at AUX, and to the STANDBY terminals of the magnetron power supply to supply current to the filament of the magnetron cathode. When a product is inserted in the left-hand cavity, for example, contacts LS1L will be closed. The left-hand motor MO2L will be energised through contacts LS1L. If the waveguide assembly is not in a position to supply power to the left hand cavity, contacts LS3L will be closed, and since relay RR is deenergised, current is supplied through RR1 and LS3L to the winding 36F of the motor, through interlock contacts MC1. The assembly will be moved to the left-hand limit position, when contact LS3L will open and contacts LS4L will close. When the left-hand door 14 is closed manually, contacts LS2L will close, energising timing device TD. The timing device contacts TD1 close and complete the circuit of main contactor MC, through contacts LS4L, and completing a circuit for the left-hand pilot lamp 18 through LS1L, LS2L, LS4L, LS1Lb and TD1. Contacts MC1 of the main contactor open, so as to prevent the windings of motor 36 being energised, and contacts MC2 close in the voltage supply line to the RUN terminals of the magnetron; contacts DC1L and DC2L are also closed, and the anode circuit of the magnetron is energised causing it to generate radio frequency energy which is applied through the feed wave guides to the left-hand cavity. At the end of the time delay period controlled by timing device TD, contacts TD1 open to deenergise the main contactor MC and the pilot lamps, and contacts TD2 close, thereby operating door release a solenoid DSL through LS3La, releasing the latch on the left hand door 16 and allowing the product in the left hand cavity to pop up under spring action, making it available for removal from the oven.

It will be noted that when a single product is inserted, the rotation motor corresponding to the other cavity, and the associated pilot light are not energised.

It is possible to insert two products almost simultaneously, and the apparatus then heats each product in turn automatically. Suppose the first product is inserted in the left-hand cavity, as before. Contacts LS1L will close and the rotation motor MO2L will be energised. Relay RL will be energised opening contacts RL1 and hence maintaining open the circuit to relay RR and winding 36R. Contacts LS3L will be closed and the feed waveguide 26 will move to the left-hand cavity, irrespective of whether a second product is now inserted in the right-hand cavity. The left-hand door may be closed before or after insertion of the second product in the right-hand cavity, and the heating cycle for the left-hand cavity will proceed as described above. The second product may be inserted in the right-hand cavity before the first product is ejected from the left-hand cavity, and it will be appreciated that this affords a saving in operating time compared with an oven having only a single cavity. In these circumstances, when the second product is inserted, contacts LS1R will close, energising motor MO2R, but the winding 36R will not be energised to swing the feed waveguide 26 over to the right-hand cavity until contacts MC1 close at the end of the heating cycle, and contacts LS1L open as the product is ejected from the left-hand cavity, deenergising relay RL and closing contacts RL1, and only then will the heating cycle for the right hand cavity begin; the right-hand door may be closed at any time. It will be noted that when the first heating cycle ends, and contacts TD2 close, only the left-hand door opens, since the waveguide is in the left-hand position, opening contacts LS3Ra. It goes without saying that the apparatus operates in an analogous manner if a first product is inserted in the right hand cavity, and if a second product is then inserted in the left hand cavity.

FIGURE 4 shows an adaptation of the above control circuit which is provided for an oven intended for operation by a customer in association with a vending machine. The circuit of FIGURE 3 is modified by the addition of motors DCML and DCMR connected mechanically to the cavity doors 14 and 15, respectively, for closing the doors automatically when the cavities are not in use. The mechanical connections may be of the kind described in co-pending application Ser. No. 565,022, filed July 13, 1966, now Patent No. 3,381,605, issued May 7, 1968.

Further normally open contacts TD3 are closed by the timing device TD approximately 3 seconds before the end of the heating cycle. Microswitches having respective normally open contact pairs HO1L and HO1R are associated with respective cams on the motor shafts of the motors, and each remains closed during almost a complete revolution of its associated motor which moves the associated door from its open to its closed position. Each of the contact pairs LS1L and LS1R is modified by the addition of a further stator contact, indicated at LS1La and LS1Ra in FIGURE 4 which is normally closed and is opened when the associated door is closed.

The control circuits of the vending mechanism, as disclosed in Patent No. 3,381,605, include normally open contacts VCC1 which are closed when an appropriate coin or other credit item is inserted subject to the usual assessments, for instance of the weight and size of the credit item. The vending mechanism circuits also include normally closed contacts VEC1 which open when no product is available for dispensing, and where the mechanism is adapted to vend a variety of products, also includes a switch SPB which is closed when selection of a product is made; contacts SPB may be arranged to remain open if the product selected is not intended for subsequent heating. The contacts VEC1, VCC1 and SPB are connected in series. This vending mechanism circuit is modified by the addition of a relay VC in series, and by parallel connected normally closed contact pairs LS1Lc and LS1Rc which are opened when a product is inserted in the associated cavities; the parallel combination of LS1Lc and LS1Rc is connected in series with the other components of this vending control circuit, and the arrangement is such that a third product to be heated cannot be dispensed by the vending mechanism while two products are inserted in the cavities. Relay VC has normally open contact pairs VC1, VC2, VC3 and VC4. Contacts VC1 are connected in series between contacts LS1La and the connection between contacts LS3La and TD2, and contacts VC2 are similarly connected between LS1Ra, and LS3Ra and TD2. Normally closed contacts LS2La and LS2Ra are open when doors 14 and 15 respectively are closed and are connected between contacts TS and respectively VC4 and VC3. VC3 and VC4 are connected to DSL and DSR, respectively.

Three seconds before the heating cycle is completed, contacts TD3 close. When contacts LS1La or LS1Ra close as the associated door opens at the end of the heating cycle, the associated motor DCML or DCMR is energised and begins to rotate; the corresponding pair of holdon contacts HO1L or HO1R close and that motor rotates through 360°. It is arranged that the associated door does not begin to close until a short period has elapsed, so that the heated and partially ejected product may be removed. A safety switch SSL or SSR is provided so that if the closing door encounters an obstruction such as a partially ejected product which has not been removed the energisation circuit for the motor is broken, the motor completing its revolution when the obstruction is removed.

With both doors closed, and with at least one of the cavities open, the vending mechanism may be actuated by inserting an appropriate coin to close contacts VCC1 and pressing selector pushbutton SPB if a product is available, and this operation energises relay VC. Contacts VC1, VC2, VC3 and VC4 close if the feed waveguide 26 is at its left-hand position, for instance, contacts LS3La are closed and solenoid DSL is energised, opening the left-hand door. The vended product can now be inserted in the left-hand cavity and a single heating cycle will then be performed as described with reference to FIGURE 3. A second product may be heated automatically in a continuous double cycle if it is vended before the first product is inserted and the door closed. When the second product is vended, if for instance the left-hand door has already been opened (the waveguide 26 being in its left-hand position), then contacts LS2La are closed, and the door solenoid DSR is energised to open the right hand door. Both products may now be inserted, and will be heated automatically in succession as described above with reference to FIGURE 3. Thus the apparatus enables two products vended simultaneously to be heated more rapidly than if only a single cavity were provided, while still offering protection against misuse, or wanton abuse of the apparatus. Further protection may be provided by ensuring that the magnetron is not energised if for instance an article is inserted having the correct dimensions to enable the ejection plunger to be depressed and the cavity door to close, but presenting an inappropriate impedance to the R.F. radiation generated by the magnetron; in such circumstances reflection of power back to the magnetron by the impedance mismatch would damage the magnetron; a suitable device (not shown) could monitor the standing wave ratio in the feed waveguide. Such a device is described and claimed in copending Smith application Ser. No. 540,007, filed Apr. 4, 1966.

It will be appreciated that many modifications and alterations of the apparatus described are possible. For instance, the oven cavities need not be of the "popup" kind. The displaceable feed waveguide 26 could be replaced by a suitable stationary microwave switch. Moreover, the door opening and closing may be arranged to be performed entirely manually, with suitable latches, or could be performed entirely automatically.

What I claim is:

1. Heating apparatus including a plurality of oven cavity structures defining respective cavities for receiving articles to be heated, door means for closing said cavities, a source of radio frequency electromagnetic heating energy, and switchable connection means for connecting said source alternatively to said cavities, whereby a plurality of said articles concurrently positioned in respective ones of said cavities may be heated in said cavities in succession.

2. Heating apparatus according to claim 1 wherein said connection means comprises a plurality of feed waveguide connections to respective ones of said cavities, and a further waveguide connected to said source, said further waveguide being displaceable between a plurality of discrete positions in which it is connected to respective ones of said feed waveguides.

3. Heating apparatus according to claim 1 and including reversible drive means for altering the condition of said connection means, whereby to change the cavity to which said source is connected, and connection control means for controlling the operation of said drive means, said connection control means including means for preventing actuation of said drive means while said source is operating.

4. Heating apparatus according to claim 3 wherein said connection control means includes a plurality of article responsive means responsive to the positioning of an article in respective ones of said cavities, and a plurality of connection responsive means associated with respective ones of said cavities and responsive to the absence of connection of said source to the associated ones of said cavities, said drive means being responsive to simultaneous actuation of one of said article responsive means and of the corresponding one of said connection responsive means, corresponding to the positioning of an article in a cavity to which said source is not connected, to switch said connection means to that cavity.

5. Heating apparatus according to claim 4 wherein said connection control means includes means responsive to actuation of a first one of said article responsive means associated with a first one of said cavities when a further one of said article responsive means associated with a second one of said cavities is subsequently actuated to prevent energisation of said drive means to switch said connection means to the second cavity while the first article responsive means is still actuated.

6. Heating apparatus according to claim 1 wherein said door means includes a plurality of door members associated with respective ones of said cavities, and including a plurality of door release means associated with respective ones of said door members for allowing the respective door members to be displaced to open positions after an article has been heated in the associated cavities.

7. Heating apparatus according to claim 6 and including timing means responsive to the elapse of time intervals, means responsive to said timing means for actuating said source for a heating period to heat one of said articles, a plurality of connection responsive means ones of said cavities, and door release actuation means responsive to the connection of said source to respective ones of said cavities, and door release actuation means responsive to the elapse of said heating period and to actuation of one of said connection responsive means to actuate selectively the associated one of said door release means.

8. For use in association with vending apparatus having vending responsive means for producnig a signal in responsive to the vending of an article from said vending apparatus, heating apparatus including a plurality of oven cavity structures defining respective cavities for receiving articles to be heated, door means for closing said cavities, a source of radio frequency electromagnetic heating energy, and switchable connection means for connecting said source alternately to said cavities, whereby a plurality of said articles concurrently positioned in respective ones of said cavities may be heated in said cavities in successive heating periods, said door means including a plurality of door members associated with respective ones of said cavities, a plurality of door release means associated with respective ones of said door members for allowing the respective door members to be displaced to open positions after an article has been heated in the associated cavities, and door closing means for closing said door members after elapse of each said heating period, and a plurality of article responsive means responsive to an article not being positioned in respective ones of said cavities, said door release actuation means being responsive to simultaneous production of said signal and actuation of at least one of said article responsive means, corresponding to operation of said vending apparatus while at least one of said cavities is empty to operate the associated door release means.

9. Heating apparatus according to claim 8 wherein said door release actuation means is responsive to simultaneous actuation of said vending responsive means, one of said article responsive means, and the associated one of said connection responsive means to actuate selectively the associated one of said floor release means.

10. Heating apparatus according to claim 9 and including a plurality of door open responsive means responsive to the positioning of respective ones of said door members in the open positions, said door release actuation means being responsive to simultaneous actuation of said vending responsive means and of one of said door open responsive means, corresponding to operation of said vending apparatus when at least one of said door members is already open, to operate one of said door release means associated with a different one of said cavities.

References Cited

UNITED STATES PATENTS 3,177,333   4/1965   Lamb _____ 219—10.55

BILLY J. WILHITE, *Primary Examiner.*

U.S. Cl. X.R.

99—357, 448; 219—10.55